(12) United States Patent
Lee et al.

(10) Patent No.: US 8,957,781 B2
(45) Date of Patent: Feb. 17, 2015

(54) REAL TIME MONITORING SYSTEM OF SPENT FUEL POOL AND METHOD THEREOF

(75) Inventors: Sang Jong Lee, Daejeon (KR); Jae Don Choi, Daejeon (KR); Young Baek Kim, Daejeon (KR); Tae Je Kwon, Daejeon (KR); Hae Chan Lee, Daejeon (KR); Young Ho Park, Daejeon (KR); Jae Il Lee, Daejeon (KR); Jung Seon An, Daejeon (KR); Seoung Eun Chun, Daejeon (KR); Song Kee Sung, Daejeon (KR)

(73) Assignee: Kepco Nuclear Fuel Co., Ltd., Daejeon (KR)

( * ) Notice: Subject to any disclaimer, the term of this patent is extended or adjusted under 35 U.S.C. 154(b) by 136 days.

(21) Appl. No.: 13/593,162

(22) Filed: Aug. 23, 2012

(65) Prior Publication Data

US 2013/0063269 A1 Mar. 14, 2013

(30) Foreign Application Priority Data

Sep. 8, 2011 (KR) .......................... 10-2011-0091158

(51) Int. Cl.
| | |
|---|---|
| *G08B 17/00* | (2006.01) |
| *G21C 17/00* | (2006.01) |
| *G21C 17/035* | (2006.01) |
| *G21C 19/07* | (2006.01) |
| *G21D 3/00* | (2006.01) |

(52) U.S. Cl.
CPC .............. *G21C 17/035* (2013.01); *G21C 19/07* (2013.01); *G21D 3/001* (2013.01); *Y02E 30/40* (2013.01)
USPC ........... 340/584; 340/506; 376/245; 376/247; 376/250

(58) Field of Classification Search
CPC .... Y02E 30/40; Y02E 30/38; G21Y 2004/40; G21Y 2002/303; G21C 3/334; G21C 17/06; G21C 17/003
USPC ............... 340/584, 686.1, 506, 292; 376/203, 376/298, 246, 313, 245, 247, 250
See application file for complete search history.

(56) References Cited

U.S. PATENT DOCUMENTS

| | | | |
|---|---|---|---|
| 2007/0209434 A1* | 9/2007 | Peters | 73/290 V |
| 2012/0106692 A1* | 5/2012 | Keenan | 376/203 |
| 2012/0307957 A1* | 12/2012 | Sedlacek et al. | 376/313 |

FOREIGN PATENT DOCUMENTS

| | | |
|---|---|---|
| JP | 58-10696 A | 1/1983 |
| JP | 07-128485 A | 5/1995 |
| JP | 08-220280 A | 8/1996 |

(Continued)

*Primary Examiner* — Hoi Lau
(74) *Attorney, Agent, or Firm* — Rabin & Berdo, P.C.

(57) ABSTRACT

A real time monitoring system of a spent fuel pool includes a detection unit configured to detect condition information using a sensor installed in the spent fuel pool; an input storage unit configured to receive and store configuration information of a spent fuel, history information related to burnup, and a normal value and a limit value of current condition information; an operation and determination unit configured to calculate the current condition information of the spent fuel by using the condition information detected by the detection unit and the configuration information and the history information stored in the input storage unit and configured to determine a risk level by comparing the current condition information with the limit value corresponding to the risk level; and a display unit configured to display the current condition information calculated by the operation and determination unit and configured to display the determined risk level.

7 Claims, 2 Drawing Sheets

(56) References Cited

FOREIGN PATENT DOCUMENTS

| | | |
|---|---|---|
| JP | 11-242092 A | 9/1999 |
| JP | 2004-184390 A | 7/2004 |
| JP | 2004-257978 A | 9/2004 |
| JP | 2008-281525 A | 11/2008 |
| KR | 10-0798006 B1 | 1/2008 |
| KR | 10-2011-0036193 A | 4/2011 |

* cited by examiner

REAL TIME MONITORING SYSTEM OF SPENT FUEL POOL AND METHOD THEREOF

CROSS-REFERENCE TO RELATED APPLICATIONS

The present application claims priority benefits under 35 U.S.C. §119 to Korean Patent Application No. 10-2011-0091158, filed Sep. 8, 2011.

BACKGROUND OF THE INVENTION

1. Field of the Invention

The present invention relates to a real time monitoring system of a spent fuel pool and a method thereof, and more particularly to a real time monitoring system of a spent fuel pool and a method thereof in which a risk level is calculated and monitored in real time based on condition information detected by a sensor of a storage tank for storing spent fuel and input information.

2. Description of the Related Art

Spent fuel generates decay heat due to a decay of a radioactive nuclide, and thus a cooling system is needed for cooling the spent fuel. The cooling of the spent fuel stored in a spent fuel storage tank is performed by using water inside a water tank, a pump, and a heat exchanger, which are used to remove the decay heat of the spent fuel.

Typically, only a sensor for measuring temperature and a water level of the spent fuel storage tank is used and real time calculation of the decay heat or a radiation source term is not reflected in a spent fuel pool condition.

However, in practice, current condition information related to the decay heat or the radiation source term is needed to determine the risk level of the fuel storage tank. To this end, additional information such as configuration of the spent fuel or burnup history is required to calculate such information; however, a system for calculating such information has not been developed, and thus, accurate estimation of the risk level is difficult.

Meanwhile, Korean Patent Publication No. 10-2011-0036193, titled as "a monitoring device for supercooling redundancy of nuclear reactor, published on Apr. 7, 2011, discloses an apparatus for calculating a subcooling margin of a nuclear reactor coolant by receiving a temperature signal and a pressure signal from a plurality of sensors, respectively, to be calculated and compared with temperature, pressure and subcooling margin that is entered, wherein the apparatus includes a calculation module, an average value selection unit and a signal selection unit. However, calculation of the decay heat or the radiation source term of the spent fuel pool is not reflected and thus an exact risk calculation is difficult

SUMMARY OF THE INVENTION

Accordingly, the present invention has been made keeping in mind the above mentioned problems occurring in the related art, and an object of the present invention is to provide a real time monitoring system of a spent fuel pool and a method thereof in which condition information of a spent fuel pool is detected through a sensor therewithin and separate configuration of the spent fuel or burnup history information is entered to calculate current condition information such as fuel decay heat or radiation source term, thereby displaying a risk level of the spent fuel pool.

Another object of the present invention is to provide a real time monitoring system of a spent fuel pool and a method thereof in which a required coolant amount and a required capacity of a cooling device of a spent fuel pool is calculated by using the current condition information and provided to an operator in safe preparation for an accident.

Still another object of the present invention is to provide a real time monitoring system of a spent fuel pool and a method thereof in which, when the calculated current condition information such as fuel decay heat corresponds to a high risk level, the high risk level is displayed and an alarm signal is generated by a separate alarm unit at the same time to alert an operator.

In order to accomplish the above mentioned object, the present invention provides A real time monitoring system of a spent fuel pool, the system comprising: a detection unit configured to detect condition information including temperature, water level, and pressure information using a sensor installed in the spent fuel pool; an input storage unit configured to receive and store configuration information of a spent fuel, history information related to burnup, and a normal value and a limit value of current condition information; an operation and determination unit configured to calculate the current condition information of the spent fuel by using the condition information detected by the detection unit and the configuration information and the history information stored in the input storage unit and configured to determine a risk level by comparing the current condition information with the limit value corresponding to the risk level; and a display unit configured to display the current condition information calculated by the operation and determination unit and configured to display the determined risk level.

In order to accomplish the above mentioned object, the present invention provides a real time monitoring method of a spent fuel pool using a monitoring system of a spent fuel pool including a detection unit, an input storage unit, an operation and determination unit, a display unit, and an alarm unit, the method comprising: detecting, by using the detection unit, condition information including temperature, water level, and pressure information using a sensor installed in the spent fuel pool, and receiving and storing, by using the input storage unit, configuration information of a spent fuel, history information related to burnup, and a normal value and a limit value of current condition information; calculating, by using the operation and determination unit, the current condition information of the spent fuel by using the stored configuration information and the history information and the condition information detected by the detection unit; comparing, by using the operation and determination unit, the current condition information with the limit value corresponding to a risk level to determine the risk level; determining, by using the operation and determination unit, a lower risk level when the current condition information is lower than the limit value and determining a high risk level when the current condition information is higher than the limit value; and displaying, by using the display unit, the calculated current condition information and the determined risk level.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

The features and advantages of the present invention will be apparent from the following description with reference to the attached drawings. Exemplary embodiments of the present invention are described with reference to the accompanying drawings in detail. Detailed descriptions of well-known functions and structures incorporated herein may be omitted to avoid obscuring the subject matter of the present invention.

Hereinafter, an exemplary embodiment of the present invention will be described in detail with reference to the attached drawings.

The present invention, which relates to a real time monitoring system of a spent fuel pool and a method thereof, will be described with reference to FIGS. 1 and 2.

Figure 1:
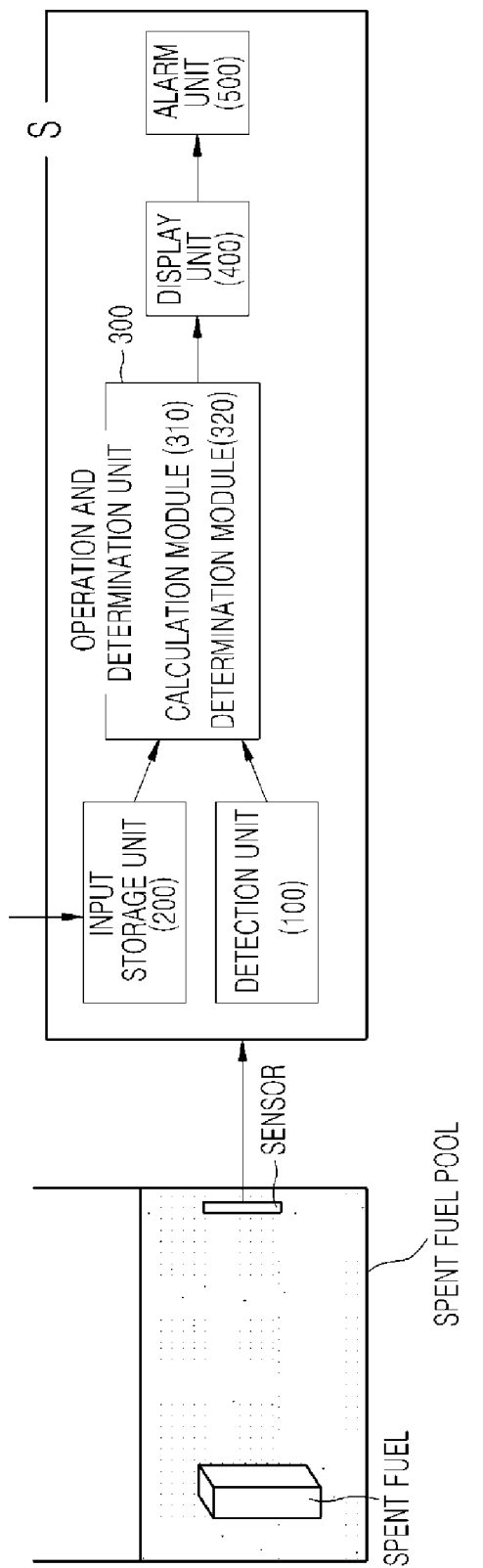
FIG. 1 is a configuration view illustrating a real time monitoring system of a spent fuel pool according to an exemplary embodiment of the present invention.

FIG. 1 is a configuration view illustrating a real time monitoring system of a spent fuel pool according to an exemplary embodiment of the present invention, and the real time monitoring system includes a detection unit 100, an input storage unit 200, an operation and determination unit 300, a display unit 400, and an alarm unit 500.

The detection unit 100 detects condition information of a nuclear fuel storage tank including temperature, a water level and pressure information through a sensor installed inside the storage tank. Typically, a sensor capable of detecting the temperature or water level is installed; however, a sensor capable of detecting the pressure information can be additionally installed, and a sensor for detecting other information can be installed.

Information detected by the sensor installed in the fuel pool is referred to as 'condition information' and is not limited to temperature, water level, or pressure information. The condition information detected by the sensor is inputted through the detection unit 100 to be stored.

The input storage unit 200 receives and stores configuration information of spent fuel and history information related to burnup. Also, the input storage unit 200 receives and stores information of a normal level and a limit value of a risk level for each "current condition information," which will be described below. Actually, in order to determine whether the spent fuel is dangerous, decay heat or a radiation source term needs to be calculated. To this end, a burnup history from loading of the fuel to emission and information such as the configuration and condition of the spent fuel are needed. This information, which is referred to as "history information" and "configuration information," respectively, is information that a user (or operator) can enter when storing the spent fuel in the storage tank. However, the information is not limited to these examples. When there is an operation value that is additionally required, a corresponding data can be additionally entered.

The operation and determination unit 300 calculates the current condition information of the spent fuel based on the condition information detected by the detection unit 100 and the configuration information and the history information stored in the input storage unit 200 and compares the current condition information with a limit value of the risk level to determine the risk level. A calculation module 310 and a determination module 320 are included.

The calculation module 310 calculates the current condition information of the spent fuel using the condition information detected by the detection unit 100 and the configuration information and the history information stored in the input storage unit 200, and the determination module 320 compares the current condition information calculated by the calculation module 310 with the limit value of the risk level and determines a low risk level when the current condition information is lower than the limit value and determines a high risk level when the current condition information is higher than the limit value.

The calculation module 310 calculates information about the decay heat of nuclear fuel, the radiation source term, a subcooling margin, a required cooling capacity, and a required coolant amount based on the condition information including temperature, water level, and pressure information of the storage tank detected by the detection unit 100, burnup information related to a history of burnup from loading of the fuel to emission stored in the input storage unit 200, and the configuration information related to the current condition. The information can be an indicator for a condition of the fuel pool when the soundness of the fuel pool is at risk.

The information about the decay heat of nuclear fuel, the radiation source term, the subcooling margin, the required cooling capacity, and the required coolant amount is referred to as "current condition information," and a method of calculating the current condition information uses a code, which will be described below. A supporting material for the code to be used is provided and the use of the code is well known in the art, and thus, a further description thereof will be omitted.

In calculating the decay heat and the radiation source term, an ORIGEN-s code (NUREG/CR-0200, Rev6, V2, Section F7 published) is used. The radiation source term is calculated by calculating how much a radionuclide or radiation source such as an alpha, beta, gamma, or neutron ray is remaining in the spent fuel, and is calculated based on received initial configuration material of the nuclear fuel, burnup and burnup history. The subcooling margin assesses a subcooling state of the cooling water and can be calculated based on a temperature and a pressure curve of the cooling water. Also, the subcooling margin can be calculated by using a condition table of the cooling water.

The required cooling energy can be calculated using the subcooling margin, and required cooling amount can be calculated by using below equation;

$$\text{Required cooling amount} = [\text{required cooling energy}] / [\partial(\text{enthalpy})/\partial(\text{temperature}) * \Delta T]$$

However, it should be noted that the above-described code is given as an example for illustrative purposes and the present invention is not limited to this in calculating the information about the decay heat, the radiation source term, the subcooling margin, the required cooling capacity and the required coolant amount.

The determination module 320 determines a current risk level of the spent fuel pool by comparing the current condition information and a corresponding limit value. The limit value for each current condition information can be varied, and the risk level can be displayed for each current condition information.

The limit value can be varied depending on a size of the storage tank, an installation location, an environment and a kind of the fuel to be stored in the storage tank. The normal value and the limit value can be controlled such that the user (or operator) can directly enter.

The determination module 320 compares the current condition information calculated by the calculation module 310 with a designated threshold value (i.e., limit value) and determines the low risk level when the current condition information is lower than the threshold value and determines the high risk level when the current condition information is higher than the threshold value.

The limit value can be two or more, and when one limit value is entered (e.g., Y<Y1), the low risk level is determined when the normal value Y is lower than the limit value Y1, and the high risk level is determined when the normal value Y exceeds the limit value Y1. When the limit values are two (e.g., Y<Y1<Y2), the low risk level is determined when the normal value Y is lower than the limit value Y1, a medium risk level is determined when the normal value Y is greater than the limit value Y1 and less than the limit value Y2, and the high risk level is determined when the normal value Y exceeds the limit value Y2.

In one embodiment, in case of the decay heat, when a temperature in the normal state, denoted as t, is lower than a temperature t1 (i.e., t≤t1), the low risk level is determined, a medium risk level is determined when t1<t≤t2, and the high risk level is determined when t>t2. When the limit values are three or more, the risk level can be determined in a method as described above.

The display unit 400 displays the current condition information calculated by the operation and determination unit 300 and displays the identified risk level. All information related to a corresponding fuel pool can be displayed, including the condition information detected by the detection unit 100, the configuration information or the history information stored in the input storage unit 200 as well as the current condition information calculated by the operation and determination unit 300.

The display unit 400 can be respectively installed inside and outside of a fuel storage tank building so that, when an accident occurs and the fuel storage tank is not accessible, the condition of the storage tank can be still identified from a far distance.

The display unit 400 needs to display not only the above-mentioned information but also the risk level, and the display unit 400 can use various display methods. In one embodiment, the low risk level can be displayed in a green color and the high risk level can be displayed in a red color. Also, depending on situations, the risk level can be displayed in characters. Here, when the limit values are two or more, multiple colors can be used. If the limit values are two, the low risk level in case of t≤t1 can be displayed in the green color, the medium risk level in case of t1<t≤t2 can be displayed in a yellow color, and the high risk level in case of t>t2 can be displayed in the red color. Here, the display is sufficient enough if the user (or operator) can visually recognize an alert for the low risk level and an alert for the high risk level.

The alarm unit 500 generates an alarm signal when the operation and determination unit 300 determines that the current condition information exceeds the limit value and thus indicates the high risk level. Visual and audio devices can be used to create various types of alarm. In addition, the alarm can be installed in a nuclear power plant main control room (MCR), independently of the storage tank, so that the alarm can be recognized by the operator.

Figure 2:
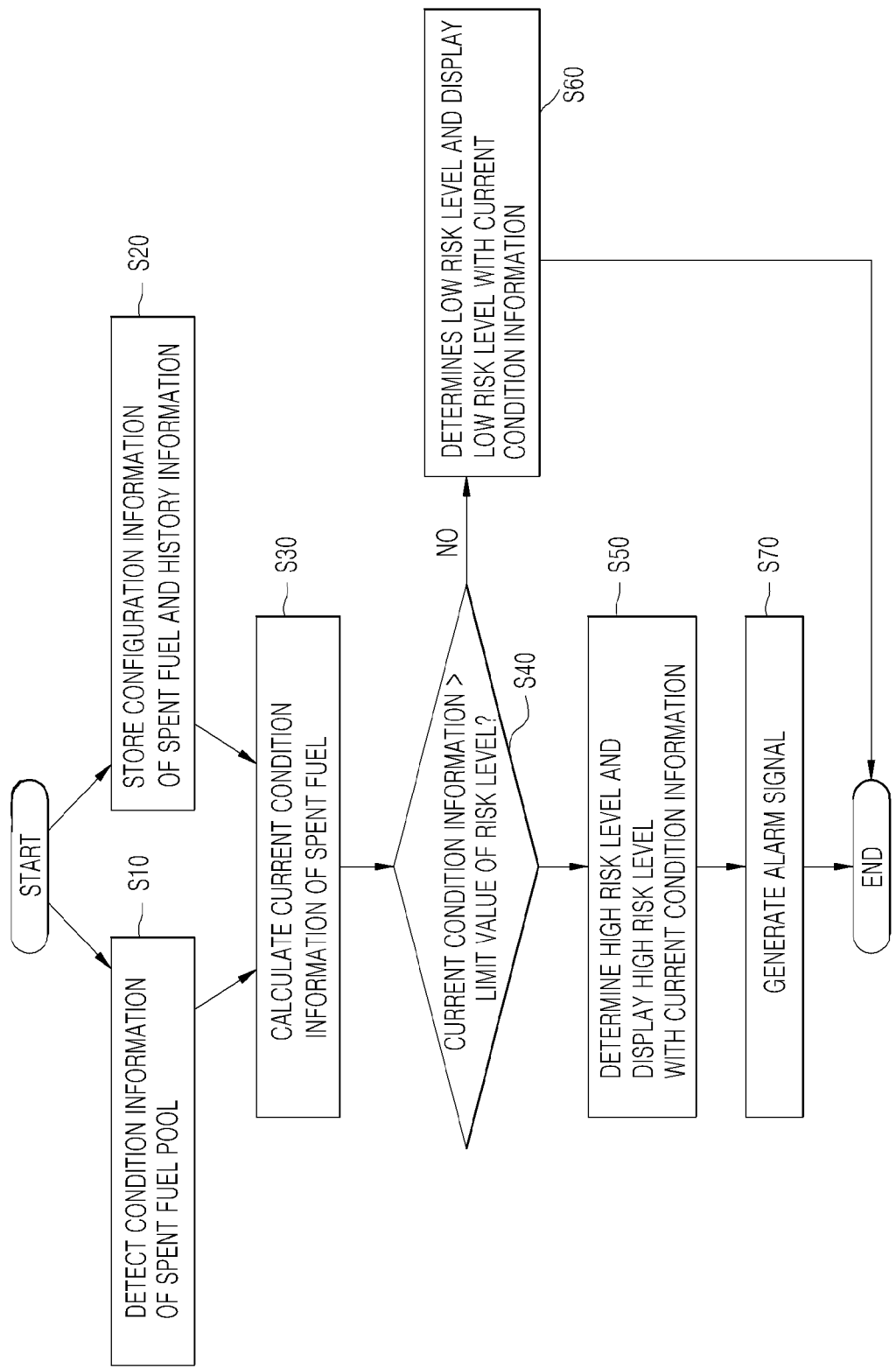
FIG. 2 is a flowchart illustrating a real time monitoring method of a spent fuel pool according to an exemplary embodiment of the present invention.

FIG. 2 is a flowchart illustrating a real time monitoring method of a spent fuel pool according to an exemplary embodiment of the present invention. Referring to FIG. 2, the real time monitoring method of a spent fuel pool will be described.

The detection unit 100 detects the condition information of the spent fuel pool including the temperature, water level and pressure information (step S10), and the input storage unit 200 receives and stores the configuration information of the spent fuel, the history information related to burnup, and the normal value and the limit value for the current condition information (step S20). Steps S10 and S20 are not necessarily performed in a specific order. The detection unit 100 can detect the condition information through the sensor when the spent fuel is stored in the storage tank, or the input storage unit 200 can receive the configuration information and the history information before the spent fuel is stored in the storage tank.

The operation and determination unit 300 calculates the current condition information of the spent fuel by using the configuration information and the history information stored in steps S10 and S20 and the detected condition information (step S30). As already described above, the current condition information includes information about the decay heat, the radiation source term, the subcooling margin, the required cooling capacity, and the required coolant amount, and the current condition information can be calculated by using the above-mentioned code.

The operation and determination unit 300 compares the current condition information calculated in step S30 with the limit value of the risk level corresponding to the current condition information (S40). The limit value of the risk level is the one that is received and stored in step S20.

The operation and determination unit 300 determines the high risk level when the current condition information exceeds the limit value of the risk level and displays the high risk level with the current condition information that is calculated at step S30 (S50). Also, the operation and determination unit 300 determines the low risk level when the current condition information is equal to or less than the limit value of the risk level and displays the low risk level with the current condition information that is calculated at step S30 (S60).

Subsequently to step S50, when the risk level is determined to be high, the alarm unit 500 generates the alarm signal to alert the operator (S70).

According to the present invention, the condition information of the spent fuel pool is detected through the sensor therewithin and the configuration information or the burnup history information of the spent fuel is separately entered so that the current condition information such as the fuel decay heat is calculated to display the risk level of the spent fuel pool.

Also, based on the current condition information, the required coolant amount and a required capacity of a cooling device of the spent fuel pool are calculated and provided to the operator in preparation for a safety accident.

Further, when the calculated current condition information such as the fuel decay heat corresponds to an actual high risk level, the high risk level is displayed while a separate alarm unit generates an alarm signal to alert the operator.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A real time monitoring system for spent fuel pool, the real time monitoring system comprising:
    a spent fuel pool storing at least one spent fuel;
    a sensor installed in the spent fuel pool;
    a detection unit detecting first information using the sensor from the spent fuel pool, the first information including at least one of a temperature, a water level, a pressure of the spent fuel pool and a radioactive emission;
    an input storage unit receiving and storing configuration information of said at least one spent fuel and history information related to burnup, the configuration information including materials of said at least one spent fuel;

an operation and determination unit calculating second information by using the first information detected by the detection unit and the configuration information and the history information stored in the input storage unit, wherein:

the input storage unit further stores a preset limit value to be compared with the second information, and the operation and determination unit determines a risk level of the spent fuel pool by comparing the second information with the preset limit value; and a display unit displaying the second information calculated by the operation and determination unit and the risk level determined by the operation and determination unit.

2. The real time monitoring system according to claim 1, wherein the second information includes at least one of a decay heat of the at least one spent fuel, a radiation source term, a subcooling margin, a required cooling energy and a required coolant amount.

3. The real time monitoring system according to claim 1, wherein the operation and determination unit comprises:

a calculation module calculating the second information of the at least one spent fuel by using the first information detected by the detection unit and the configuration information and the history information stored in the input storage unit; and a determination module comparing the second information calculated by the calculation module with the preset limit value and determining the risk level of the spent fuel pool, wherein the risk level is determined as low when the second information is lower than the preset limit value and the risk level is determined as high when the second information is higher than the preset limit value.

4. The real time monitoring system according to claim 1, further comprising:

an alarm unit generating an alarm signal when the risk level is high.

5. A real time monitoring method for spent fuel pool using a monitoring system including a detection unit, an input storage unit, an operation and determination unit, a display unit and an alarm unit, the method comprising:

detecting, by using the detection unit, first information from a spent fuel pool, the first information including a temperature, a water level, a pressure of the spent fuel pool and a radioactive emission;

receiving and storing, by using the input storage unit, configuration information of at least one spent fuel, history information related to burnup and a preset limit value;

calculating, by using the operation and determination unit, second information by using the stored configuration information, the history information and the first information detected by the detection unit;

comparing, by using the operation and determination unit, the second information with the preset limit value to determine a risk level of the spent fuel pool;

determining, by using the operation and determination unit, the risk level of the spent fuel pool being low when the second information is lower than the preset limit value and being high when the second information is higher than the preset limit value; and displaying, by using the display unit, the second information calculated by the operation and determination unit and the risk level determined by the operation and determination unit.

6. The real time monitoring method according to claim 5, further comprising:

generating, by using the alarm unit, an alarm signal when the risk level is high.

7. The real time monitoring method according to claim 6, wherein the second information calculated by the operation and determination unit includes at least one of a decay heat of the at least one spent fuel, a radiation source term, a subcooling margin, a required cooling capacity and a required coolant amount.

* * * * *